United States Patent
Sekiguchi

(10) Patent No.: US 7,710,247 B2
(45) Date of Patent: May 4, 2010

(54) OBJECT RECOGNIZING APPARATUS

(75) Inventor: Hiroyuki Sekiguchi, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 341 days.

(21) Appl. No.: 11/750,879

(22) Filed: May 18, 2007

(65) Prior Publication Data
US 2007/0286475 A1 Dec. 13, 2007

(30) Foreign Application Priority Data
May 19, 2006 (JP) ............................ P2006-140755

(51) Int. Cl.
*B60Q 1/00* (2006.01)

(52) U.S. Cl. ...................... 340/435; 340/436; 340/903; 701/96; 701/301

(58) Field of Classification Search ................. 340/903, 340/904, 435, 436; 701/301, 96, 207; 180/274; 342/52–55, 70–72
See application file for complete search history.

(56) References Cited

U.S. PATENT DOCUMENTS 6,163,252 A * 12/2000 Nishiwaki ................... 340/435

2004/0167717 A1 * 8/2004 Buchanan et al. ........... 701/301
2005/0125154 A1 * 6/2005 Kawasaki .................... 701/301

FOREIGN PATENT DOCUMENTS

JP 2005-165421 6/2005

* cited by examiner

Primary Examiner—Anh V La
(74) Attorney, Agent, or Firm—Dickstein, Shapiro, LLP.

(57) ABSTRACT

An existence probability of an image object based on an image taken by a stereo camera 2 is calculated by an image object existence probability calculating portion 11, an existence probability of a millimeter wave object based on an output of a millimeter wave radar 3 is calculated by a millimeter wave object existence probability calculating portion 12, and an existence probability of a laser object based on an output of a laser radar 4 is calculated by a laser object existence probability calculating portion 13. Further, the respective existence probabilities of the image object, the millimeter wave object, the laser object are corrected based on recognizing rates of the respective recognizing sensors by an existence probability correcting portion 14, the existence probabilities after correction is fused as a fusion existence probability by a fusion existence probability calculating portion 15, thereby, a control of avoiding contact with a hazard or alarming or the like is made to be able to execute by a firm and optimum timing.

10 Claims, 6 Drawing Sheets

OBJECT RECOGNIZING APPARATUS

BACKGROUND OF THE INVENTION

The present invention relates to an object recognizing apparatus for recognizing a n object existed at a periphery of own vehicle based on a plurality of sensors for detecting the object at the periphery of the own vehicle.

The disclosure of Japanese Patent Application No. 2006-140755 filed on May 19, 2006 including the specification, drawings and abstract is incorporated herein by reference in its entirety.

In recent years, in a vehicle of an automobile or the like, there is developed a technology of recognizing an object including a three-dimensional object existed in a running direction of own vehicle by detecting an outside vehicle environment by a camera, a millimeter wave radar, a laser radar or the like, which is applied to a vehicle control of a collision avoiding control or the like.

Although according to such a technology of recognizing an object, generally, there are used recognizing sensors represented by a camera, a millimeter wave radar, a laser radar and the like, the recognizing sensors pose a problem that a dispersion is brought about in a detecting accuracy by a running environment. Therefore, recently, there is proposed a method referred to as sensor fusion of mounting a plurality of sensors of a camera, a millimeter wave radar, a laser radar and the like on a vehicle and recognizing a front object by fusing outputs detected by the respective sensors.

For example, Patent Reference 1 discloses a technology in which based on respective data detected by an image recognizing apparatus including a millimeter wave radar and a camera, probability distributions showing accuracy of the respective data are calculated, the respective data are fused by calculating a product of a plurality of the probability distributions with regard to the same data value, and a kind of a front object is investigated based on a data value showing the highest probability.

According to the technology disclosed in Patent Reference 1, even in a case in which a probability of a probability distribution calculated based on data detected by one front recognizing means is reduced, when a probability distribution calculated based on data detected by other front recognizing means shows a high probability, the kind of the front object can be recognized by using a data value of the high probability. [Patent Reference 1] JP-A-2005-165421

However, only by determining an object simply by a height of a probability distribution as disclosed in Patent Reference 1, there is a concern that by an uncertain factor of a characteristic of a sensor for detecting a periphery situation, a degree of influencing on a vehicle stabilization by a control apparatus or the like, there is brought about a situation in which an operational timing of an avoiding control, an alarming control or the like against contact (collision) of the object and own vehicle is excessively early or excessively retarded, and a pertinent control timing is not necessarily produced.

SUMMARY OF THE INVENTION

The invention is carried out in view of the above-described situation and it is an object thereof to provide an object recognizing apparatus capable of executing a avoiding control, an alarming control or the like against contact (collision) of the object based on a result of recognizing an object at a pertinent timing against uncertain factors of a characteristic of a sensor for detecting a periphery situation, a degree of influencing on a vehicle stabilization by a control apparatus, a running environment and the like.

In order to achieve the above-described object, according to a first aspect of the present invention, there is provided an object recognizing apparatus for recognizing an object existing around own vehicle by a plurality of sensors, including:

an existence probability calculating unit configured to calculate each existence probability of the object to each sensor based on a normal distribution centering on an output value of each sensor;

an existence probability correcting unit configured to calculate each corrected existence probability by correcting said each existence probability with a recognizing rate of each sensor; and a fusion existence probability calculating unit configured to calculate a fusion existence probability of the object by fusing said each corrected existence probability.

According to a second aspect of the present invention, there is provided an object recognizing apparatus for recognizing an object existing around own vehicle based on a plurality of sensors, including:

an existence probability calculating unit configured to calculate each existence probability of the object to each sensor based on a normal distribution centering on an output value of each sensor, an existence probability correcting unit configured to calculate corrected existence probability by correcting said each existence probability in accordance with a stabilization of own vehicle; and a fusion existence probability calculating unit configured to calculate a fusion existence probability of the object by fusing said each corrected existence probability.

According to a third aspect of the present invention, there is provided an object recognizing apparatus for recognizing an object existing around own vehicle based on a plurality of sensors, including:

an existence probability calculating unit configured to calculate each existence probability of the object to each sensor based on a normal distribution centering on an output value of each sensor, an existence probability correcting unit configured to calculate corrected existence probability by correcting said each existence probability with each characteristic of sensors set in accordance with a running environment of own vehicle; and a fusion existence probability calculating unit configured to calculate a fusion existence probability of the object by fusing said each corrected existence probability.

The object recognizing apparatus according to the invention can execute a control based on a result of recognizing the object by a pertinent timing against uncertain factors of a characteristic of a sensor for detecting a periphery situation, a degree of influencing on a vehicle stabilization by a control apparatus, a running environment and the like.

DETAILED DESCRIPTION OF THE PREFERRED EMBODIMENTS

Figure 1:
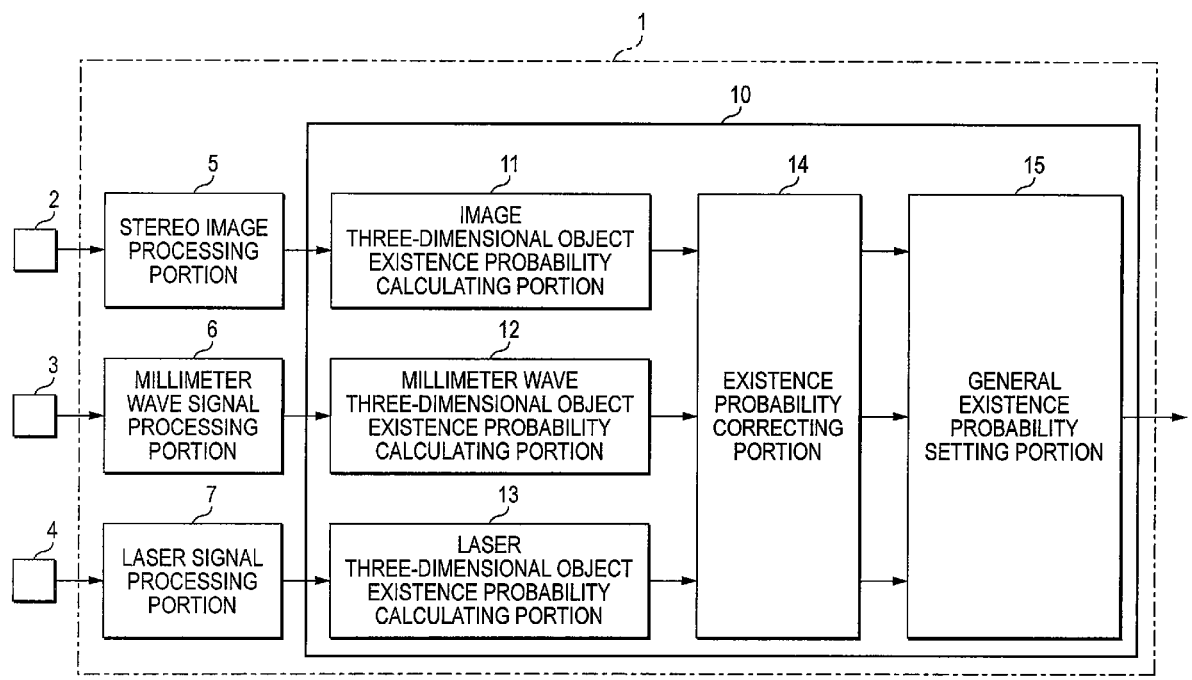
FIG. 1 is a block diagram of a object recognizing apparatus according to a first mode of an embodiment of the invention.
Figure 2:
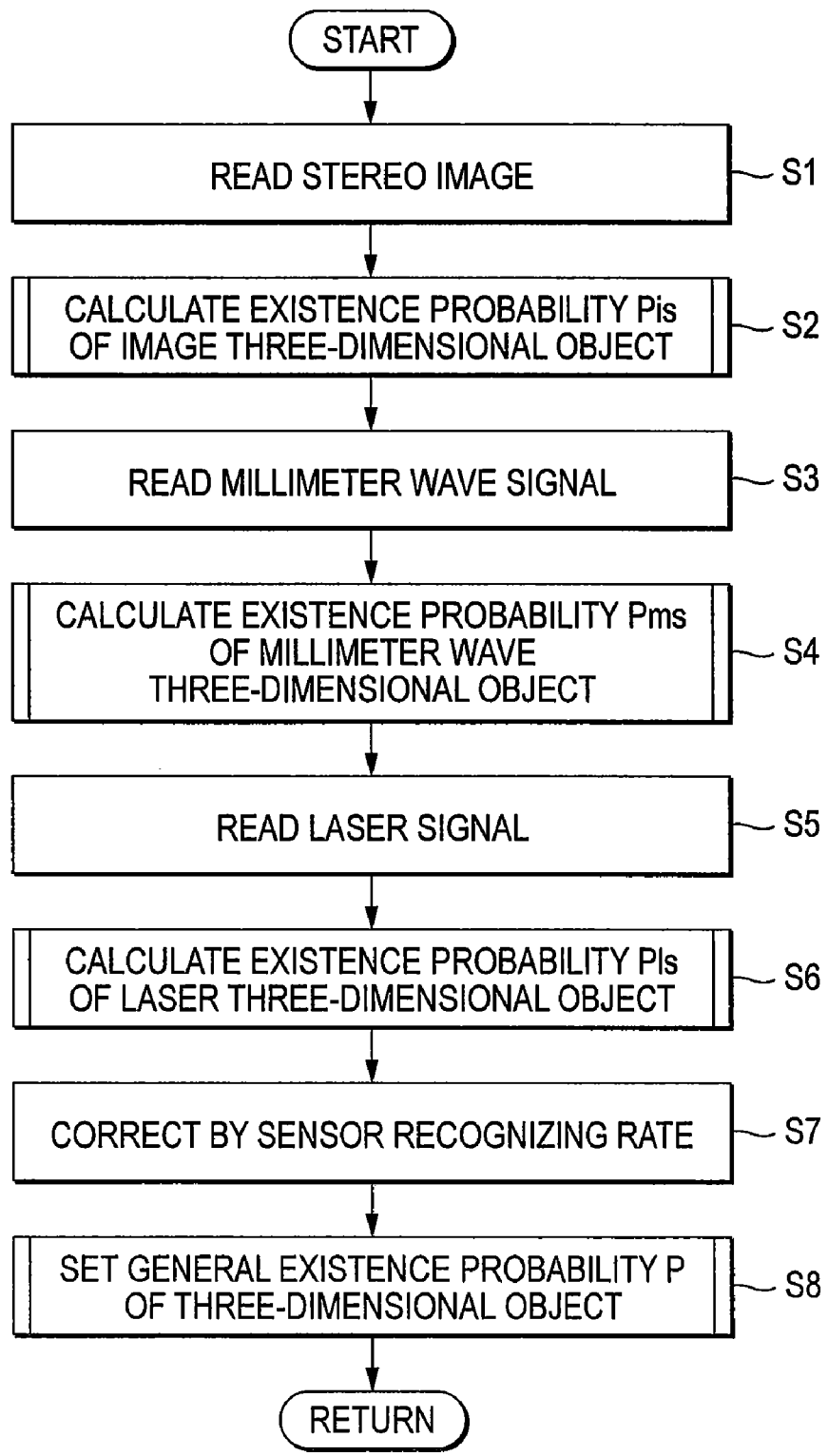
FIG. 2 is a flowchart of a fusion existence probability calculating processing of the same.
Figure 3:
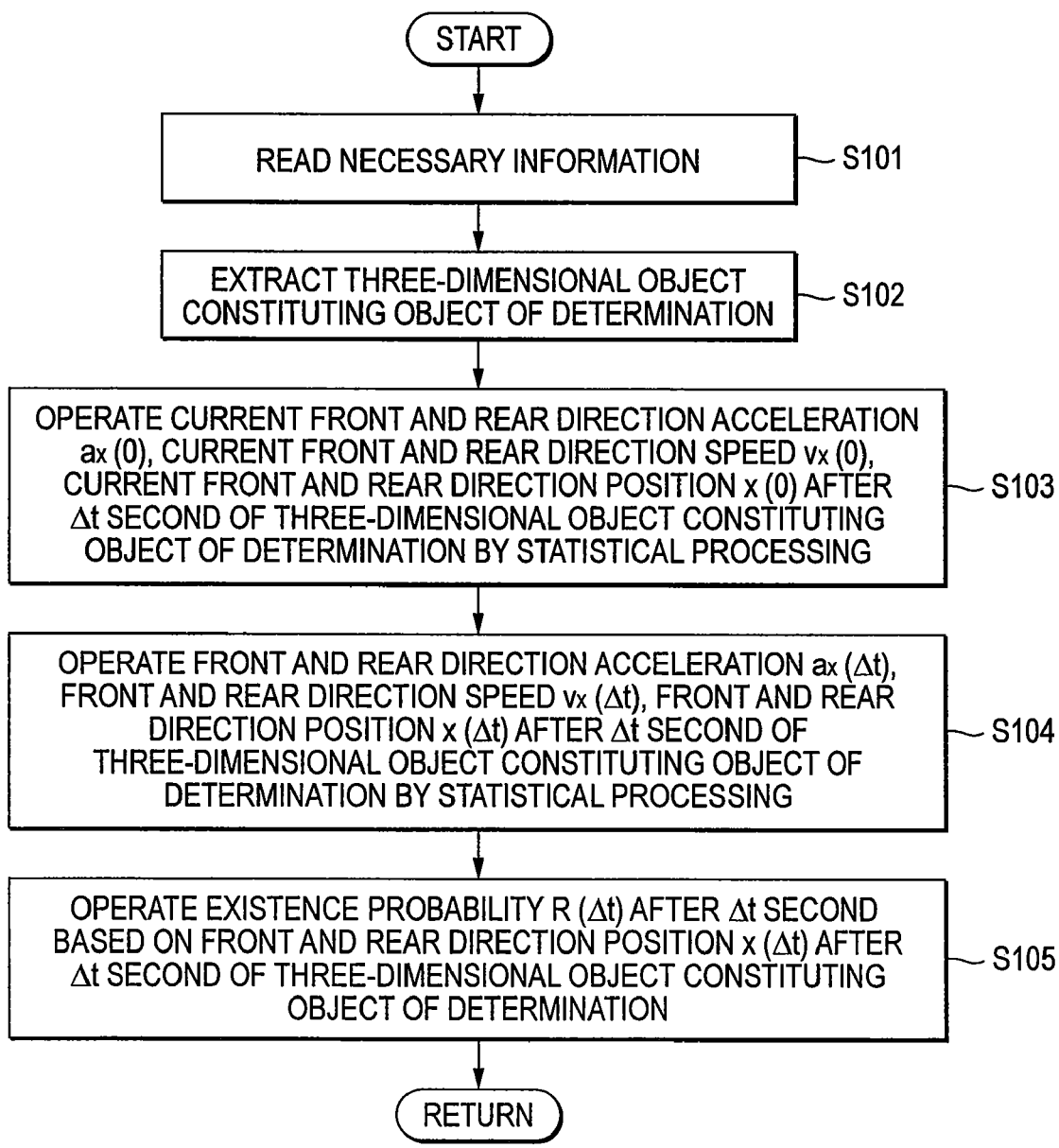
FIG. 3 is a flowchart showing an existence probability calculating processing of an object by a recognizing sensor of the same.
Figure 4:
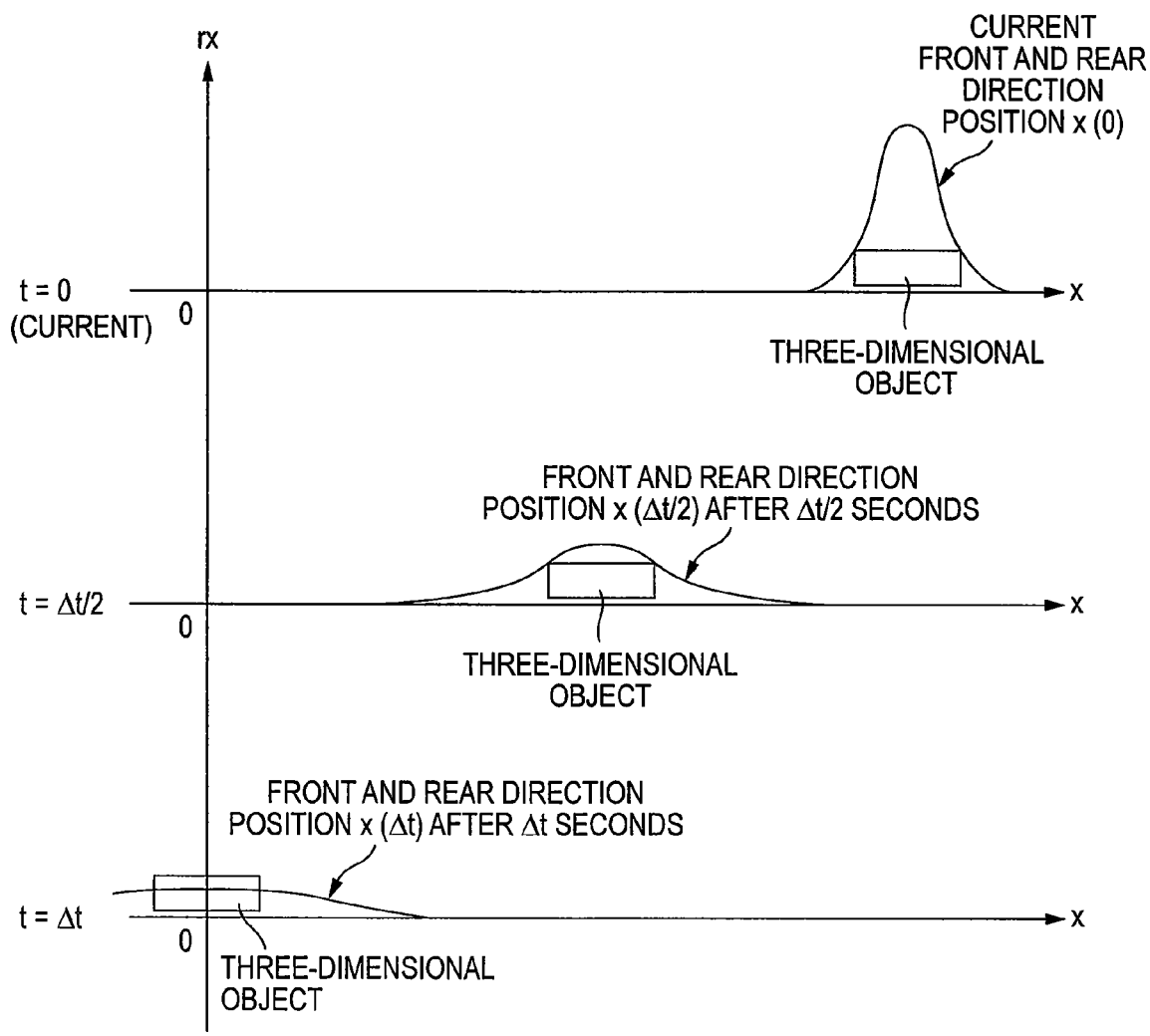
FIG. 4 is an explanatory view showing transition of a statistical position of an object constituting an object of determination of the same.
Figure 5:
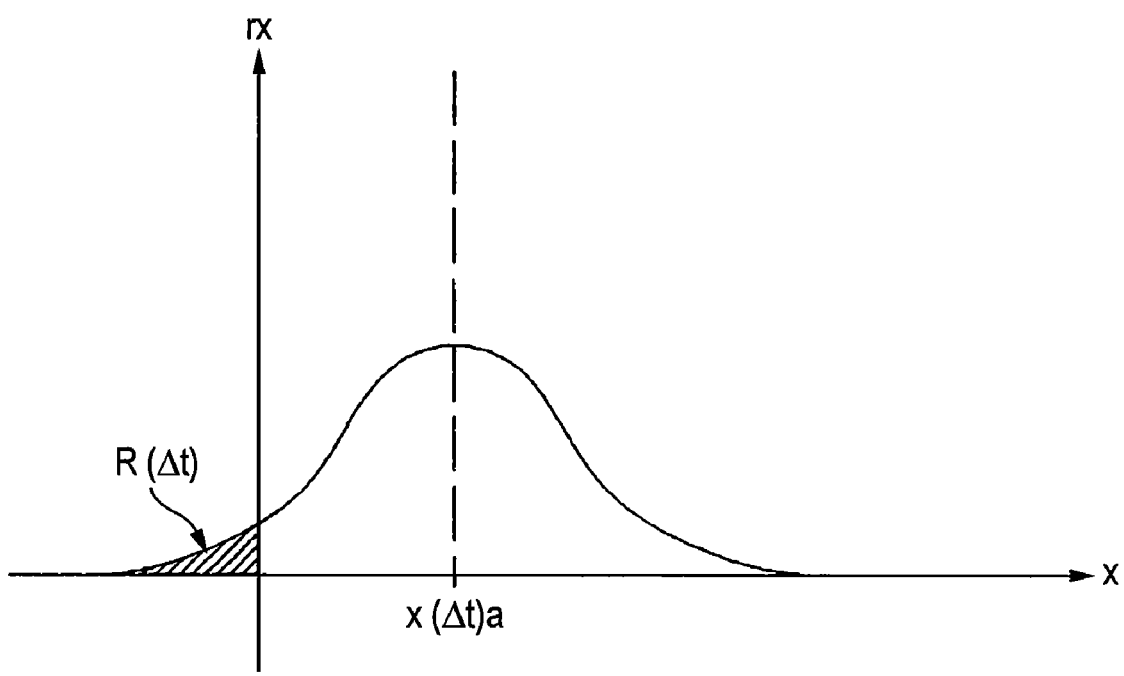
FIG. 5 is an explanatory view of an existence probability of the same.

Embodiments of the invention will be explained in reference to the drawings as follows. FIG. 1 to FIG. 5 relate to a first mode of the embodiments of the invention, FIG. 1 is a block diagram of an object recognizing apparatus, FIG. 2 is a flowchart of a fusion existence probability calculating processing, FIG. 3 is a flowchart showing an existence probability calculating processing of an object by a recognizing sensor, FIG. 4 is an explanatory view showing transition of a statistical position of an object constituting an object of determination, FIG. 5 is an explanatory view of an existence probability.

In FIG. 1, notation 1 designates an object recognizing apparatus mounted on a vehicle of an automobile or the like for recognizing an object including a three-dimensional object by processing a signal from a recognizing sensor for detecting an outside field situation, which outputs a result of recognizing the object to a vehicle control apparatus, not illustrated, for making the vehicle control apparatus execute an alarming control or an avoiding control or the like against contact (collision) of the object and own vehicle. According to the mode, an explanation will be given of an example of mounting 3 kinds of recognizing sensors having different detecting characteristic of a stereo camera 2, millimeter wave radar 3, a laser radar 4 on a vehicle and recognizing an object highly accurately by fusing existence probabilities of the object recognized based on outputs of the respective recognizing sensors.

The object recognizing apparatus 1 includes a stereo image processing portion 5 for processing an image taking signal taken by the stereo camera 2, a millimeter wave signal processing portion 6 for processing a signal from the millimeter wave radar 3, a laser signal processing portion 7 for processing a signal from the laser radar 4, and the object is extracted based on, the stereo image, the millimeter wave signal, the laser signal respectively by the respective processing portions 5 to 7. Information of the object extracted by the processing portions 5 to 7 is transmitted to an object recognizing portion 10 and the object is recognized by a fusion existence probability fusing the object based on the signals from the respective recognizing sensors.

The stereo camera 2 is constituted by arranging a pair of left and right cameras (CCD cameras or CMOS camera) mounted with solid image taking elements by a predetermined base line length for taking in stereo an outside vehicle scenery from different view points. The stereo camera 2 is attached to, for example, an upper side of a room mirror at inside of a vehicle compartment for outputting an image taking in stereo the vehicle outside scenery to the stereo image processing portion 5.

The stereo image processing portion 5 extracts the object of a vehicle, a walker or the like by generating a distance data by a principle of triangulation from a shift amount of a position of the detected object (hereinafter, referred to as 'image object') based on the stereo image taken by the stereo camera 2 and comparing the data by a well-known grouping processing or with a previously stored object data based on the distance data. Further, as a characteristic amount (image characteristic amount) for specifying the image object, for example, there is calculated a distance coordinate value in a front and rear direction of a vehicle body, a position coordinate value in a vehicle width direction a relative speed (a change over time of the distance coordinate) or the like constituting an original point by the vehicle.

Further, the millimeter wave radar 3 is attached substantially at a center in the vehicle width direction of a front end portion of the vehicle for radially emitting a plurality of pieces of beams of millimeter waves. That is, the millimeter wave emitted from the millimeter wave radar 3 is difficult to narrow slenderly in comparison with laser light of the laser radar 4, and therefore, by emitting radially the plurality of pieces of beams of millimeter waves and receiving reflected waves from the object, the object is detected.

The millimeter wave signal processing portion 6 calculates a characteristic amount (millimeter wave characteristic amount) for specifying the object (hereinafter, referred to as 'millimeter wave object') based on a detecting signal from the millimeter wave radar 3. For example, the distance coordinate value in the front and rear direction of the vehicle body is calculated based on a time period from transmitting to receiving the millimeter wave by the millimeter wave radar 3, and the position coordinate value in the vehicle width direction is calculated based on a direction of transmitting the beam from which the reflected wave is received in the plurality of pieces of beams. Further, the relative speed is calculated from a change in the distance coordinate value based on a Doppler's principle.

On the other hand, the laser radar 4 can emit slenderly narrowed laser light, irradiates a pulse while scanning laser light having a slender width by a predetermined of visibility angle and receives reflected light from the object. The laser radar 4 is attached to a position substantially the same as that of the millimeter wave radar 3, for example, and irradiates a pulse while scanning laser light having the slender width transmitted to a front side of the vehicle in a vehicle width direction (or the vehicle width direction and a height direction) having the predetermined of visibility angle.

The laser signal processing portion 7 calculates a characteristic amount (laser characteristic amount) for specifying the object (hereinafter, referred to as 'laser object') based on a detecting signal from the laser radar 4. For example, as the laser characteristic amount, the distance coordinate value in the front and rear direction of the vehicle body is calculated based on a time period from transmitting to receiving laser light by the laser radar 4, the position coordinate value in the vehicle width direction is calculated based on a direction of transmitting laser light when reflected light is received, and the relative speed is calculated from a change over time of the distance coordinate value.

Further, a coordinate system expressing the respective characteristic amounts of the object detected by the respective processing portions 5 to 7 is set in conformity with a coordinate system constituting a reference (for example, a coordinate system for recognizing the image object).

Data of the object extracted by the respective processing portions 5 to 7 are transmitted to the object recognizing portion 10. The object recognizing portion 10 includes an image object existence probability calculating portion 11 for calculating an existence probability of an image object detected based on the image, a millimeter wave object existence probability calculating portion 12 for calculating an existence probability of a millimeter wave object detected based on the millimeter wave, and a laser object existence probability calculating portion 13 for calculating an existence probability of a laser object detected based on the laser light, and the existence probabilities are calculated for the respective individual recognizing sensors.

Further, as mentioned later, as for the present embodiment, the respective existence probabilities of the image object, the millimeter wave object, the laser object are calculated basically by using a similar algorism.

Further, the object recognizing portion 10 includes an existence probability correcting portion 14 and a fusion existence probability calculating portion 15. The existence probability correcting portion 14 corrects the existence probabilities of the respective recognizing sensors based on the characteristics of the respective recognizing sensors and transmits the corrected existence probabilities to the fusion existence probability calculating portion 15. The fusion existence probability calculating portion 15 calculates a fusion existence probability as a result of recognizing the object by fusing the respective corrected existence probabilities transmitted from the existence probability correcting portion 14.

In details, the existence probabilities of the respective recognizing sensors, correction of the respective existence probabilities, and the fusion existence probability are carried out after being processed by program processings shown in flowcharts of FIG. 2, FIG. 3. The processings will be explained in reference to the flowcharts of FIG. 2, FIG. 3 as follows.

The flowchart of FIG. 2 shows a fusion existence probability calculating processing, first, at step S1, as a function of the stereo image processing portion 5, the stereo image taken by the stereo camera 2 is read to extract the image object, and the characteristic amounts of the position coordinate, the relative speed and the like are calculated. Successively, the operation proceeds to step S2 and calculates the existence probability Pis of the image object.

At successive step S3, as a function of the millimeter wave signal processing portion 6, the millimeter wave signal detected by the millimeter wave radar 3 is read to calculate the position coordinate, the relative speed and the like of the millimeter wave object, at step S4, the existence probability Pms of the millimeter wave object is calculated.

Further, the operation proceeds to step S5, as a function of the laser signal processing portion 7, the laser signal from the laser radar 4 is read, and the position coordinate, the relative speed and the like of the laser object is calculated from the read laser signal. Further, at step S6, the existence probability Pls of the laser object is calculated.

Next, the operation proceeds to step S7, as a function of the existence probability correcting portion 14, the respective existence probabilities Pis, Pms, Pls of the image object, the millimeter wave object, the laser object are corrected based on characteristics of the respective recognizing sensors. The correction sets an optimum correction value by an experiment or a simulation based on recognition theoretical values of the sensors, as recognizing rates of the respective recognizing sensors, there are used parameters depending on detecting characteristics inherent to the sensors, for example, lost rates for temporarily in capacitating detection of the object, a correct recognizing rate capable of correctly detecting the object, an error recognizing rate for erring detection of the object or the like.

Further, as shown by equations (1) to (3) shown below, the respective existence probabilities Pis, Pms, Pls calculated based on the stereo camera 2, the millimeter wave radar 3, the laser radar 4 are corrected by using a recognizing rate Ki of the stereo camera 2, a recognizing rate Km of the millimeter wave radar 3, a recognizing rate Kl of the laser radar 4 to provide existence probabilities Pi, Pm, Pl after correction.

$$Pi = Pis \times Ki \quad (1)$$

$$Pm = Pms \times Km \quad (2)$$

$$Pl = Pls \times Kl \quad (3)$$

Thereafter, the operation proceeds to step S8, as a function of the fusion existence probability calculating portion 15, the existence probability Pi by the stereo camera 2, the existence probability Pm by the millimeter wave radar 3, the existence probability Pl by the laser radar 4 are fused as a fusion existence probability P of the object as sensor fusion by equation (4) shown below.

$$P = 1 - (1-Pi) \times (1-Pm) \times (1-Pl) \quad (4)$$

The fusion existence probability P calculated by the above-described processings is applied to execution of maintaining the state as it is, a hazard information display, an alarming control, an automatic brake control and the like in accordance with a magnitude of a value thereof. In this case, the fusion existence probability P according to equation (4) is calculated based on a multiplied value multiplying a nonexistence probability (1−Pi) of the image object, a nonexistence probability (1−Pm) of the millimeter wave object, a nonexistence probability (1−Pl) of the laser object, and when there is a sensor which does not recognize the object, for example, when the image is lost, the existence probabilities by the millimeter wave and the laser are set.

Thereby, the operational timing of avoiding contact with the hazard or the control of alarm or the like can be accelerated when the existence probability is high and can be retarded when the existence probability is low, and a control by a firm and optimum timing can be carried out. Further, an erroneous control to a hazard having a low detection reliability can be avoided.

Further, in place of the fusion existence probability P according to equation (4), the fusion existence probability P may be calculated in consideration of reliabilities of the respective recognizing sensors. That is, when a reliability of the millimeter wave laser 3 is designated by notation α, a reliability of the laser radar 4 is designated by notation β, and a reliability of the stereo camera 2 is designated by notation γ, the fusion existence probability P is calculated by equation (5) shown below.

$$P = (Pm \times \alpha) + (Pl \times \beta) + (Pi \times \gamma) \quad (5)$$

Incidentally, in equation (5), α+β+γ=1, the reliabilities α, β, γ of the respective recognizing sensors are set to ratios of, for example, α: β: γ=5:3:2 by assuming that the reliabilities become high in an order of the millimeter wave, the laser, the image.

According to the fusion existence probability P according to equation (5), when any sensor of the stereo camera 2, the millimeter wave radar 3, the laser radar 4 is brought into a nondetectable state, the existence probability of the object by the sensor may be set to 0, similarly, the operational timing of the control can be accelerated when the existence probability is high, can be retarded when the existence probability is low, the control by the firm and optimum timing can be carried out, and erroneous control for the hazard having the low detection reliability can be avoided.

Next, processings of calculating the existence probabilities by the respective recognizing sensors will be explained. According to the embodiment, the respective existence probabilities of the image object, the millimeter wave object, the laser object are calculated basically by using a similar operation algorism. According to an operation algorism of the existence probability, generally, an operation of a probability distribution in consideration of a behavior of the object constituting an object of determination is carried out, in this case, an explanation will be given by representing the processings of calculating the existence probabilities by the respective recognizing sensors by a processing of calculating an existence probability of FIG. 3 and representing the existence probabilities Pis, Pms, Pls by the respective recognizing sensors by an existence probability R.

In the processing of calculating the existence probability, first, at step S101, information necessary for the operation (for example, image information, vehicle speed V0 of one's own vehicle and the like) is read. Next, the operation proceeds to step S102, extracts the object (for example, the most proximate object disposed on a path of advancing the one's own vehicle) constituting the object of determination, and acquires respective data of a distance x to the object, a speed Vx in the front and rear direction of the object (a differential value of the distance x+one's own vehicle V0), an acceleration ax in the front and rear direction of the object (a differential value of the speed Vx in the front and rear direction) and the like.

Successively, the operation proceeds to step 103 and calculates a current acceleration ax (0) in the front and rear direction, a current speed Vx (0) in the front and rear direction, a current position ax (0) in the front and rear direction by a statistical processing by equations (7) to (9) shown below by assuming that respective data each is outputted by a normal distribution constituting an axis (x axis) by the front and rear direction of the vehicle centering on a true value (an average value according to the embodiment) based on respective data of the distance x to the 1 object constituting the object of determination, the speed Vx in the front and rear direction (differential value of distance x+one's own vehicle speed V0), the acceleration ax in the front and rear direction (differential value of the speed Vx in the front and rear direction) and the like.

Further, in the following normal distribution, $-\infty < x < \infty$, and a dispersion of the normal distribution is a positive value. Further, in the statistical operation of the acceleration in the front and rear direction, the speed in the front and rear direction and the position in the front and rear direction, a probability density function r of equation (6) by an average value $\mu$, a dispersion $\sigma^2$ of the normal distribution is applied.

$$r=(1/((2\cdot\pi)^{1/2}\cdot\sigma))\cdot\exp(-(x-\mu)^2/(2\cdot\sigma^2)) \quad (6)$$

That is, the current acceleration ax (0) in the front and rear direction is operated by ax (ax (0) a, $\sigma ax$ (0)$^2$) as shown by equation (7) shown below as a normal distribution having an average value ax (0) a of the current acceleration in the front and rear direction, and a dispersion $\sigma ax$ (0)$^2$ indicated by a deviation $\sigma ax$ (0) in the current acceleration in the front and rear direction.

$$ax(0) = ax(ax(0)a, \sigma ax(0)^2) \quad (7)$$
$$= (1/((2\cdot\Pi)^{1/2}\cdot\sigma ax(0)))\cdot\exp(-(x-ax(0)a)^2/(2\cdot\sigma ax(0)^2))$$

Further, the current speed Vx (0) in the front and rear direction is operated by Vx (Vx (0) a, $\sigma vx$ (0)$^2$) as shown by equation (8) shown below as a normal distribution having an average value Vx (0) a of the current speed in the front and rear direction and a dispersion $\sigma vx$ (0)$^2$ indicated by a deviation $\sigma vx$ (0) of the current speed in the front and rear direction.

$$Vx(0) = Vx(Vx(0)a, \sigma vx(0)^2) \quad (8)$$
$$= (1/((2\cdot\Pi)^{1/2}\cdot\sigma vx(0)))\cdot\exp(-(x-Vx(0)a)^2/(2\cdot\sigma vx(0)^2))$$

Further, the current position ax (0) in the front and rear direction is operated by x (x(0) a, $\sigma x$ (0)$^2$) as shown by equation (9) shown below as a normal distribution having an average value x (0) a of the current position in the front and rear direction, and a dispersion $\sigma x$ (0)$^2$ indicated by a deviation $\sigma x$ (0) of the current position in the front and rear direction.

$$x(0) = x(x(0)a, \sigma x(0)^2) \quad (9)$$
$$= (1/((2\cdot\Pi)^{1/2}\cdot\sigma x(0)))\cdot\exp(-(x-x(0)a)^2/(2\cdot\sigma x(0)^2))$$

Further, the above-described respective dispersions $\sigma ax$ (0)$^2$, $\sigma vx$ (0)$^2$, $\sigma x$ (0)$^2$ are values previously set by the recognizing sensor or the recognizing object, in comparison with recognition by the stereo camera 2, in recognition by the millimeter wave radar 3 or the laser radar 4, speed accuracy is high, and therefore, the dispersion can be set to be small.

Next, the operation proceeds to step S104 and calculates an acceleration ax ($\Delta t$) in the front and rear direction, a speed Vx ($\Delta t$) in the front and rear direction, a position x ($\Delta t$) in the front and rear direction after $\Delta t$ second (for example, after 0.5 second) based on the current acceleration ax (0) in the front and rear direction of the object constituting the object of determination, the current speed Vx (0) in the front and rear direction, the current position x (0) in the front and rear direction by a statistical processing by equations (10) to (12) shown below.

That is, the acceleration ax ($\Delta t$) after $\Delta t$ second is operated by ax (ax ($\Delta t$) a, $\sigma ax$ ($\Delta t$)$^2$) as a normal distribution having an average value ax ($\Delta t$) a of the acceleration in the front and rear direction after $\Delta t$ second and a dispersion $\sigma ax$ ($\Delta t$)$^2$ indicated by a deviation $\sigma ax$ ($\Delta t$) of the acceleration in the front and rear direction after $\Delta t$ second. Further, according to the embodiment, the calculation is carried out by assuming an equal acceleration movement.

$$ax(\Delta t) = ax(ax(\Delta t)a, \sigma ax(\Delta t)^2) \quad (10)$$
$$= ax(ax(0)a, \sigma ax(0)^2)$$

Further, the speed Vx ($\Delta t$) in the front and rear direction after $\Delta t$ second is operated by Vx (Vx ($\Delta t$) a, $\sigma vx$ ($\Delta t$)$^2$) as a normal distribution having an average value Vx ($\Delta t$) a of the speed in the front and rear direction after $\Delta t$ second and a dispersion $\sigma vx$ ($\Delta t$)$^2$ indicated by a deviation $\sigma vx$ ($\Delta t$) of the speed in the front and rear direction after $\Delta t$ second. At this occasion, equation (11) shown below is operated by using the current acceleration ax (0) in the front and rear direction, the current speed Vx (0) in the front and rear direction.

$$Vx(\Delta t) = Vx(Vx(\Delta t)a, \sigma vx(\Delta t)^2) \quad (11)$$

-continued $$= Vx(Vx(0)a, \sigma vx\ (0)^2) + ax(ax(0)a, \sigma ax(0)^2) \cdot \Delta t$$

$$= Vx(Vx(0)a + ax(0)a \cdot \Delta t, (\sigma vx(0) + \sigma ax(0) \cdot \Delta t)^2)$$

Further, the position x (Δt) in the front and rear direction after Δt second is operated by x (x (Δt) a, σx (Δt)²) as a normal distribution including an average value x (Δt) a of the position in the front and rear direction after Δt second and a dispersion σx (Δt)² indicated by a deviation σx (Δt) of the position in the front and rear direction after Δt second. At this occasion, the calculation is carried out by using the current acceleration ax (0) in the front and rear direction, the current speed Vx (0) in the front and rear direction, the current position x (0) in the front and rear direction as shown by equation (12) shown below.

$$x(\Delta t) = x(x(\Delta t)a, \sigma x(\Delta t)^2) \qquad (12)$$

$$= x(x(0)a, \sigma x(0)^2) + Vx(Vx(0)a, \sigma vx(0)^2) \cdot \Delta t +$$

$$(1/2) \cdot ax(ax(0)a, \sigma ax(0)^2) \cdot \Delta t^2$$

$$= x(x(0)a + vx(0)a \cdot \Delta t + (1/2) \cdot ax(0)a \cdot \Delta t^2,$$

$$(\sigma x(0) + \sigma vx(0) \cdot \Delta t + (1/2) \cdot \sigma ax(0) \cdot \Delta t^2)^2)$$

Thereafter, the operation proceeds to step S105 and calculates an existence probability R (Δt) of the object after Δt second by equation (13) shown below based on the position x (Δt) in the front and rear direction after Δt second of the object constituting the object of determination.

$$R(\Delta t) = \int (x(x(\Delta t)a, \sigma x(\Delta t)^2))dx \qquad (13)$$

(where, an integration range is −∞<x<0)

That is, when the current position x (0) in the front and rear direction of the object constituting the object of determination is indicated by the normal distribution, it is predicted that a position x (Δt/2) in the front and rear direction after Δt/2 second, the position x (Δt) in the front and rear direction after Δt second are disposed at positions shown in FIG. 4. Therefore, the probability density function of the normal distribution with regard to the position in the front and rear direction is introduced as a risk function rx for evaluating the risk, the normal function is integrated by assuming the position of the one's own vehicle as 0 on x axis as shown by FIG. 5 (integration range: −∞<x<0), and the area (value of risk function rx after t second) is operated as the existence probability R (Δt).

Further, the position x (Δt) after Δt second of the object constituting the object of determination is the function of the normal distribution, and therefore, a result of integration in −∞<x<∞ is 1.0.

Thereby, a risk distribution of a risk of contact (collision) of the one's own vehicle and the object or the like can continuously be grasped, an erroneous control based on information having a low reliability can be prevented and preventing safety can be promoted.

Figure 6:
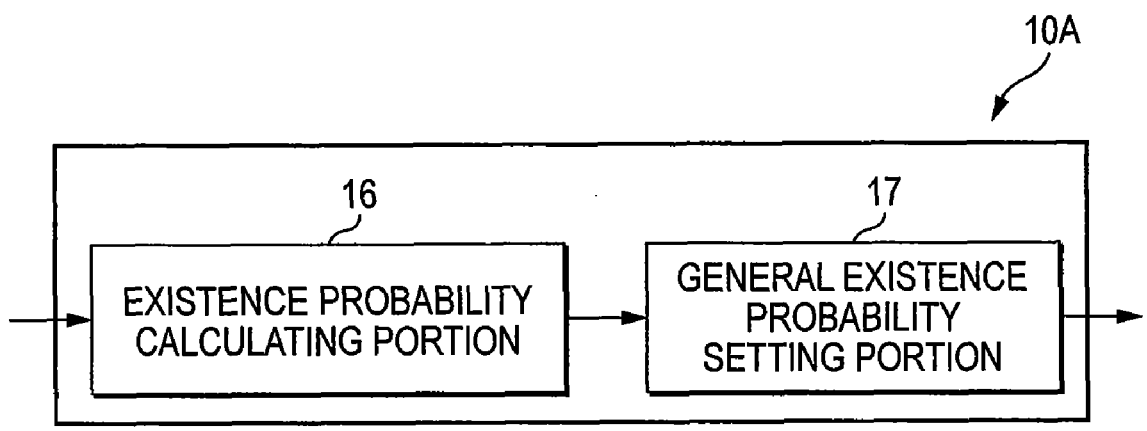
FIG. 6 is a block diagram of an object recognizing portion according to a second mode of the embodiment to the invention.

Next, a second mode of the embodiment of the invention will be explained. FIG. 6 is a block diagram of an object recognizing portion according to the second mode of the embodiment of the invention.

According to the second mode, weighting of the existence probability of the object is made to be variable in accordance with a factor other than the recognizing sensor, and as a factor thereof, a degree of stabilization of own vehicle including a parameter related to vehicle stabilization, a degree of effect on a vehicle stabilization by a vehicle stability control apparatus, or a running environment of the vehicle are taken into consideration.

Here, the parameter related to vehicle stabilization includes lateral acceleration, yaw moment, or slip rate of a vehicle or the like.

Further, the vehicle stability control apparatus includes an antilock brake control apparatus (ABS apparatus), or a vehicle dynamics control apparatus (VDC apparatus) or the like The second mode is applicable also to a case of having at least one sensor of the stereo camera 2, the millimeter wave radar 3, the laser radar 4 as the recognizing sensor, as shown by FIG. 6, the object recognizing portion 10 according to the first mode is constituted by an object recognizing portion 10A including an existence probability calculating portion 16 and a fusion existence probability calculating portion 17. In this case, an existence probability Ps calculated by the existence probability calculating portion 16 represents the existence probability Pis of the image object, the existence probability Pms of the millimeter wave object, the existence probability Pls of the laser object. An operation algorism of the existence probability Ps is similar to that of the first mode.

According to the fusion existence probability calculating portion 17, when a degree of influencing on a vehicle stabilization in working of a vehicle stability control apparatus is taken into consideration, a fusion existence probability P is calculated by using an evaluation value α1 previously evaluating the degree of influencing on the vehicle stabilization by a vehicle stability control apparatus of an antilock brake control apparatus (ABS apparatus), or a vehicle dynamics control apparatus (VDC apparatus) or the like.

For example, the evaluation value is set as α1=0.1 in the ABS apparatus, the evaluation value is set as α1=0.2 in the VDC apparatus, and as shown in equation (14), the existence probability Ps is weighted by the evaluation value α1 to be made to be variable and is calculated as the fusion existence probability P.

$$P = Ps \times (1-\alpha 1) \qquad (14)$$

Thereby, when a stabilization of a behavior of the vehicle by the ABS apparatus or the VDC apparatus can be expected, the operational timing of the avoiding operation or the alarming operation by the existence probability Ps can retardedly be set, and an excessive interference with a driver can be prevented by restraining an unnecessary control.

On the other hand, when the fusion existence probability P is calculated in consideration of a running environment of the vehicle, a detecting characteristic of a recognizing sensor as shown below is taken into consideration. For example, the detecting characteristics of the object by the stereo camera 2, the millimeter wave radar 3, the laser radar 4 are shown in relation to the running environment as follows. Here, ⊚, ○, △, × indicate detection accuracies, ⊚ designates excellent, ○ designates slightly excellent, △ designates slightly poor, × designates poor.

|  | millimeter wave radar | image | laser radar |
| --- | --- | --- | --- |
| speed/distance | ⊚ | ○ | ⊚ |
| lateral position | ○ | ⊚ | ⊚ |
| width | X | ⊚ | ○ |
| shape | X | ⊚ | X |

-continued

| | millimeter wave radar | image | laser radar |
|---|---|---|---|
| night | ⊚ | △ | ⊚ |
| stain of object | ○ | ⊚ | △ |
| rain/snow | ⊚ | △ | ○ |
| person | △ | ⊚ | ○ |

As described above, the millimeter wave outputted from the millimeter wave radar 3 is difficult to slenderly narrow in comparison with laser light, and therefore, a resolution of a lateral position is lower than that of the laser radar 4, an accuracy of detecting the width of the object is low, however, the object can be detected without being influenced by weather.

On the other hand, laser light emitted from the laser radar 4 can slenderly be narrowed and can continuously scan a vehicle width direction, and therefore, excellent in the resolution of the lateral position, and can highly accurately detect the lateral position, however, the laser light is refracted or reflected by raindrops, and therefore, the laser light is easy to be influenced by weather more than the millimeter wave.

Further, the stereo camera 2 recognizes the object by contrast of light, and therefore, excellent in the resolution of the lateral position and the shape, however, the resolution tends to be low in a running environment in which contrast in light, in rainfall, snowfall or the like is difficult to recognize.

Therefore, for example, when the stereo camera 2 is used as the recognizing sensor, the surrounding environment is predicted by recognizing the image or operating a wiper and the evaluation value is variably set such that the evaluation value is α2=0.1 in a running environment in rain/fog, the evaluation value is set as α2=0.2 in a running environment in snowfall, the evaluation value is set as α2=0.1+0.2=0.3 in a running environment in rain/fog and in snowfall.

Otherwise, the same goes with a case of using the millimeter wave radar 3 or the laser radar 4, and the evaluation value α2 is variably set in accordance with the running environment. Further, as shown by equation (15) shown below, the existence probability Ps is weighted by the evaluation value α2 to be variable and is set as the fusion existence probability P.

$$P=Ps\times(1+\alpha2) \quad (15)$$

Thereby, in a situation of making the vehicle tend to be unstable, the timing of the control can be accelerated, the control reliability can be promoted by the pertinent control timing and the stabilization of the vehicle can be achieved.

What is claimed is:

1. An object recognizing apparatus for recognizing an object based on signals received from a plurality of sensors, comprising:
    an existence probability calculating unit configured to calculate each existence probability of the object to each sensor based on a normal distribution centering on an output value of each sensor;
    an existence probability correcting unit configured to calculate each corrected existence probability by correcting said each existence probability with a recognizing rate of each sensor; and
    a fusion existence probability calculating unit configured to calculate a fusion existence probability of the object by fusing said each corrected existence probability.

2. The object recognizing apparatus according to claim 1, wherein the fusion existence probability is calculated based on a multiplied value calculated by multiplying each nonexistence probability of the object calculated based on the each corrected existence probability.

3. The object recognizing apparatus according to claim 1, wherein the fusion existence probability is calculated based on each multiplied value calculated by multiplying a reliability of each sensor and the each corrected existence probability.

4. The object recognizing apparatus according to claim 1, wherein said existence probability is calculated as a probability distribution after a set time period predicted from a current movement and a position of the object.

5. An object recognizing apparatus for recognizing an object based on signals received from a plurality of sensors, comprising:
    an existence probability calculating unit configured to calculate each existence probability of the object to each sensor based on a normal distribution centering on an output value of each sensor;
    an existence probability correcting unit configured to calculate corrected existence probability by correcting said each existence probability in accordance with a stabilization of own vehicle; and
    a fusion existence probability calculating unit configured to calculate a fusion existence probability of the object by fusing said each corrected existence probability.

6. The object recognizing apparatus according to claim 5, further comprising:
    a vehicle stability control apparatus to stabilize running condition of own vehicle, wherein
    the existence probability correcting unit corrects the each existence probability based on a characteristic of the vehicle stability control apparatus.

7. The object recognizing apparatus according to claim 6, wherein the vehicle stability control apparatus is at least one of an antilock-brake system and a vehicle dynamics control.

8. The object recognizing apparatus according to claim 5, wherein said existence probability is calculated as a probability distribution after a set time period predicted from a current movement and a position of the object.

9. The object recognizing apparatus according to claim 6, wherein said existence probability is calculated as a probability distribution after a set time period predicted from a current movement and a position of the object.

10. An object recognizing apparatus for recognizing an object based on signals received from a plurality of sensors, comprising:
    an existence probability calculating unit configured to calculate each existence probability of the object to each sensor based on a normal distribution centering on an output value of each sensor;
    an existence probability correcting unit configured to calculate corrected existence probability by correcting said each existence probability with each characteristic of sensors set in accordance with a running environment of own vehicle; and
    a fusion existence probability calculating unit configured to calculate a fusion existence probability of the object by fusing said each corrected existence probability.

* * * * *